US005498994A

United States Patent [19]

Furuta

[11] Patent Number: 5,498,994
[45] Date of Patent: Mar. 12, 1996

[54] ACTIVE FILTER DEVICE

[75] Inventor: Michihiro Furuta, Kobe, Japan

[73] Assignee: Mitsubishi Denki Kabushiki Kaisha, Tokyo, Japan

[21] Appl. No.: 294,048

[22] Filed: Aug. 24, 1994

[30] Foreign Application Priority Data

Sep. 7, 1993 [JP] Japan ..................... 5-222415

[51] Int. Cl.$^6$ .............................. H02M 5/40; G05F 1/70; H03K 5/00
[52] U.S. Cl. .......................... 327/532; 327/551; 327/362; 327/552; 363/95; 307/105
[58] Field of Search ..................... 327/532, 311, 327/317, 551, 552, 362; 307/105, 106; 363/95, 96, 98

[56] References Cited

U.S. PATENT DOCUMENTS

| 3,825,814 | 7/1974 | Pelly | 321/9 A |
|---|---|---|---|
| 4,812,669 | 3/1989 | Takeda et al. | 307/105 |
| 4,835,411 | 5/1989 | Takeda | 307/104 |
| 5,077,517 | 12/1991 | Tanoue et al. | 323/207 |
| 5,321,598 | 6/1994 | Moran | 323/207 |
| 5,384,696 | 1/1995 | Moran et al. | 363/40 |

OTHER PUBLICATIONS

Mitsubishi Electric Corporation Technical Report, vol. 62, No. 6, 1988.

Primary Examiner—Timothy P. Callahan
Assistant Examiner—Dinh T. Le
Attorney, Agent, or Firm—Leydig, Voit & Mayer

[57] ABSTRACT

An active filter device simple in construction and low in price in which higher harmonic components can be stably suppressed without requiring a passive filter even when a load to be compensated includes a capacitative load. Such an active filter device includes: a current transformer for detecting a load current; a frequency detection circuit for detecting higher harmonic components contained in the load current; a first three-phase/two-phase conversion circuit for determining a reference compensation current for compensating for the current with respect to a first frequency among the higher harmonic components; a first filter circuit; a first two-phase/three-phase conversion circuit; a first phase compensation circuit; an n-th three-phase/two-phase conversion circuit for determining a reference compensation current for compensating for the current with respect to an n-th frequency; an n-th filter circuit; an n-th two-phase/three-phase conversion circuit; an n-th phase compensation circuit; an adder for synthesizing the respective reference compensation currents with respect to the first frequency and the n-th frequency; an inverter circuit for outputting a resultant compensation current based on the output from the adder; and an inverter transformer.

10 Claims, 6 Drawing Sheets

THREE-PHASE STATIONARY COORDINATES
i (iu,iv,iw)

FIG. 4B

TWO-PHASE STATIONARY COORDINATES
i (iα,iβ)

FIG. 4C

ROTATING COORDINATES
i (id,iq)

FIG. 5

ACTIVE FILTER DEVICE

BACKGROUND OF THE INVENTION

1. Field of the Invention

The present invention relates to an active filter device for suppressing higher harmonic current components of the power supply system.

2. Description of the Related Art

Figure 2:
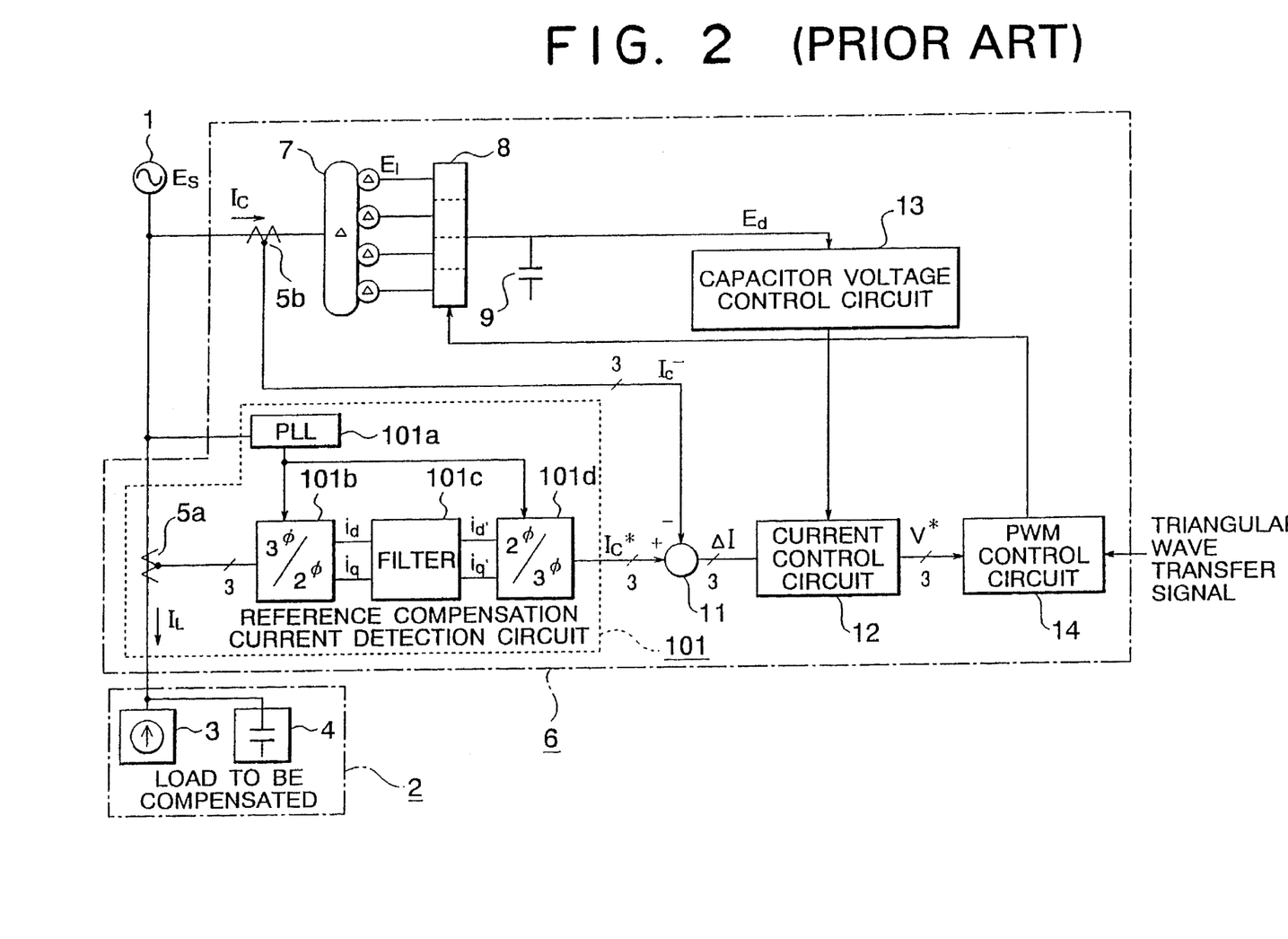
FIG. 2 illustrates the construction of a conventional active, filter device.

FIG. 2 is a circuit diagram of the construction of a conventional active filter device of the above-mentioned type disclosed in Mitsubishi Electric Corporation Technical Report vol.62.No6, 1988 p15–p20 and shows a connection between such a device and a controlled power supply system.

Referring to FIG. 2, a system power supply 1 supplies power to a load to be compensated 2 which is connected to the system power supply 1. The load to be compensated 2 comprises a higher harmonic supply 3, such as an inverter, and a capacitative load 4, such as a phase lead capacitor, or the like. A current transformer 5a detects the load current $I_L$ flowing into the load to be compensated 2. An active filter device 6 outputs the compensation current $I_C$ which has the same level and the opposite phase of a higher harmonic current component contained in the load current $I_L$ on the basis of the output from the current transformer 5a.

The active filter device 6 comprises components within the frame indicated by the one-dot chain line of FIG. 2. More specifically, the active filter device 6 comprises: a current transformer 5b for detecting components from the compensation current $I_C$; an inverter transformer 7 for permitting the compensation current $I_C$ to flow from the power system formed of the system power supply 1 and the load to be compensated 2; a self-excited inverter 8 formed of a plurality of inverter units so as to drive the inverter transformer 7 and to convert the DC voltage charged on a DC voltage supply capacitor 9 into the AC voltage; a reference compensation current detection circuit 101 for detecting the reference compensation current $I_C^*$ based on the load current $I_L$ (the details will be mentioned below); an adder-subtracter 11 for calculating the difference $\Delta I$ between the reference compensation current $I_C^*$ and the output $I_{C-}$ from the current transformer 5b; a current control circuit 12 for calculating the reference voltage $V^*$ based on the above-mentioned difference $\Delta I$ and the output from a capacitor voltage control circuit 13; the capacitor voltage control circuit 13 for controlling the voltage of the DC voltage supply capacitor 9; and a PWM (Pulse Width Modulation) control circuit 14 for driving the self-excited inverter 8 based on the output from the current control circuit 12.

The above-noted reference compensation current detection circuit 101 comprises components within the frame indicated by the broken line of FIG. 2. More specifically, the reference compensation current detection circuit 101 comprises: a PLL circuit 101a for detecting the angular velocity θ (the frequency of the fundamental wave) in synchronism with the system power supply; a 3φ/2φ conversion circuit 101b for converting an AC component of the three-phase signal ($i_{La}$, $i_{Lb}$, $i_{Lc}$) detected by the current transformer 5 into a DC component of the two-phase signal ($i_d$, $i_q$) on the basis of the angular velocity θ; a filter circuit 101c for smoothing the two-phase signal ($i_d$, $i_q$) which is output from the 3φ/2φ conversion circuit 101b; and a 2φ/3φ conversion circuit 101d for converting the two-phase signal ($i_d$, $i_q$) smoothed by the filter circuit 101c into the three-phase signal on the basis of the angular velocity θ so as to output the converted signal as the reference compensation current $I_C^*$. The reference numeral (3) in FIG. 2 indicates a signal line of the three-phase signal.

A description will now be given of the operation of the active filter device 6. The active filter device 6 is connected parallel to the load to be compensated 2 so as to detect fault current components such as a higher harmonic reactive current, or the like, contained in the load current $I_L$ and to allow the compensation current $I_C$ which has a phase opposite to that of a fault current to flow into the active filter device 6, thereby canceling the fault current component on the power supply. An explanation will be given in more detail in the case where the load current $I_L$ is supplied to the load to be compensated 2 from the system power supply 1. The current transformer 5 first detects the load current $I_L$, which is then supplied to the reference compensation current detection circuit 101. The reference compensation current detection circuit 101 determines a current which compensates the higher harmonic of the load current $I_L$, that is, the reference compensation current $I_C^*$ (the details will be mentioned below) on the basis of the load current $I_L$. The adder/subtracter 11 calculates the difference $\Delta I$ between the reference compensation current $I_C^*$ and the component $I_{C-}$ of the current $I_C$ (compensation current) flowing into the inverter transformer 7, which difference $\Delta I$ is then output to the current control circuit 12. The current control circuit 12 calculates the reference voltage $V^*$ based on the difference $\Delta I$ and the output from the capacitor voltage control circuit 13. The PWM control circuit 14 compares the reference voltage $V^*$ with a triangular wave transfer signal which is to be used for the pulse width modulation (PWM) and performs the modulation to drive the inverter units constituting the self-excited inverter 8 so that the difference $\Delta I$ can be small. The output voltage of the active filter device is thus controlled. It is noted that the output waveform (average) of the inverter units is indicated by the sine wave by performing the pulse width modulation using the triangular wave transfer signal.

The self-excited inverter 8 serving the function of the major portion of the active filter device is comprised of a plurality of inverter units which are connected in series to each other via the inverter transformer 7. The respective inverter units are controlled by the PWM control circuit 14 so as to generate the voltage required for allowing the compensation current $I_C$ to flow into the inverter transformer 7. The inverter 8 thus serves the function of converting the DC voltage charged on the DC voltage supply capacitor 9 into the AC voltage so that it can be a voltage supply for generating the AC voltage $E_f$.

As described above, the reference compensation current detection circuit 101 detects the reference compensation current $I_C^*$ based on the load current $I_L$.

The operation of the reference compensation current detection circuit 101 will now be given in detail.

The PLL circuit 101a detects the angular velocity θ (the frequency of a fundamental wave) in synchronism with the system voltage. The 3φ/2φ conversion circuit 101b converts the load current $I_L$ (the respective currents of the three phases are indicated by $i_{La}$, $i_{Lb}$, $i_{Lc}$) detected by the current transformer 5 into the two-phase signal ($i_d$, $i_q$) of the dq coordinate system on the basis of the angular velocity θ. The two-phase signal ($i_d$, $i_q$) is expressed by the following equations:

$$i_d = (2/3)\, [i_{La}\sin\theta + i_{Lb}\sin\{\theta-(2/3)\pi\} + i_{Lc}\sin\{\theta-(4/3)\pi\}]$$

$$i_q = (2/3)\, [i_{La}\cos\theta + i_{Lb}\cos\{\theta-(2/3)\pi\} + i_{Lc}\cos\{\theta-(4/3)\pi\}]$$

wherein $i_d$ indicates a phase component different from the reference angular velocity θ and $i_q$ represents an in-phase component of the angular velocity θ.

Figure 4A:
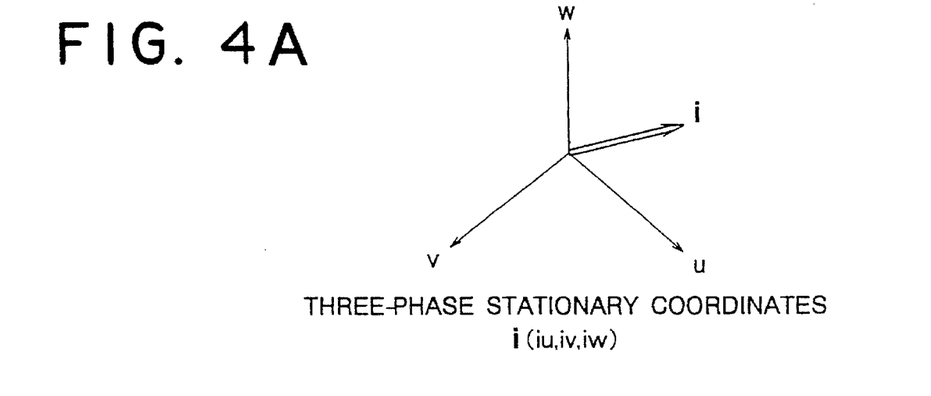
FIGS. 4A, 4B and 4C are illustrative of the principle of the operation of the active filter device.
Figure 4B:
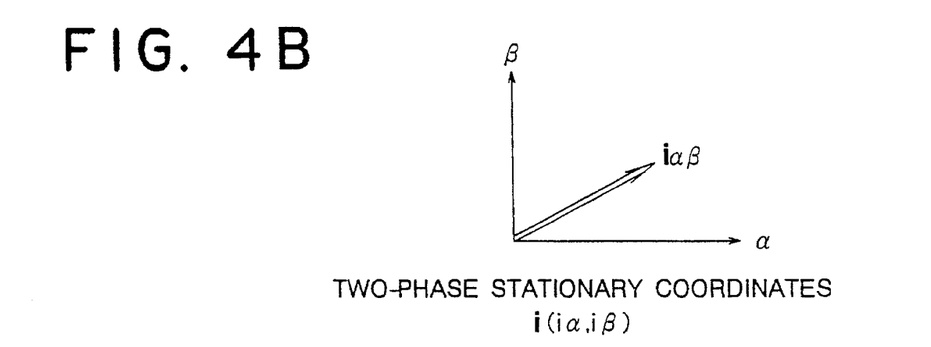
Figure 4C:
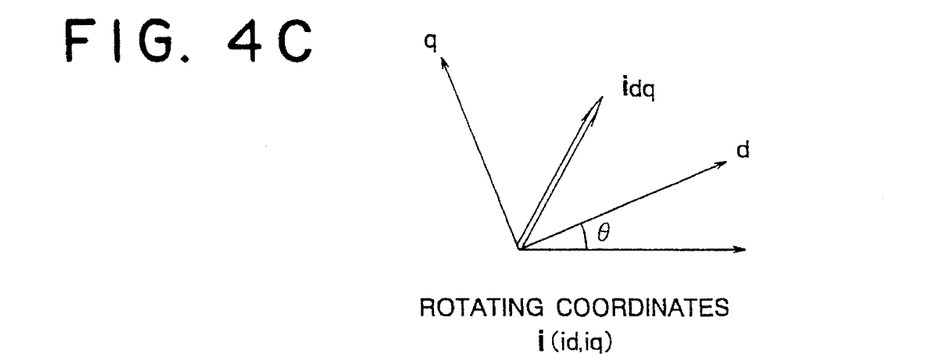

The dq conversion is conducted to determine the DC component of the angular velocity θ. In other words, the above equations are calculated so as to convert the three-phase AC into the two-phase AC based on the respective AC components and further to convert the stationary coordinate system into the rotating coordinate system on the basis of the angular velocity θ. This conversion will be further explained with reference to FIGS. 4A–4C. The three-phase AC i($i_u$, $i_v$, $i_w$) on the three-phase stationary coordinates u, w and v shown in FIG. 4A are converted into the two-phase AC i($i_α$, $i_β$) on the two-phase stationary coordinates α and β shown in FIG. 4B. Such a two-phase current i rotates on the stationary coordinates α and β which are thus converted into the two-phase rotating coordinates d and q illustrated in FIG. 4C, thereby allowing the two-phase current i to become stationary on the two-phase rotating coordinates d and q. That is, the two-phase signal ($i_d$, $i_q$) on the two-phase rotating coordinates d and q is DC. The foregoing equations are calculated to execute the above-mentioned conversions. The DC component of the angular velocity nθ of the higher harmonics can be found in a manner similar to that of the angular velocity θ of the fundamental wave.

Figure 5:
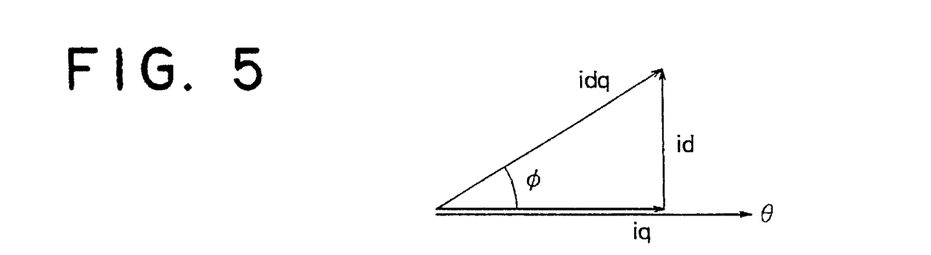
FIG. 5 is illustrative of the principle of the operation of the active filter device.

The thus-obtained output $i_d$ and $i_q$ from the 3φ/2φ conversion circuit 101b correspond to a phase component different from a signal indicative to the angular velocity θ and an in-phase component of the angular velocity θ, respectively. Where the phase difference between the rotation axis upon which the conversion of the rotation coordinate system is based and the vector ($i_d$, $i_q$) is indicated by φ, the relationship between the two components id and iq is illustrated in FIG. 5.

The filter 101c is a circuit for smoothing the two-phase signal ($i_d$, $i_q$). A high-pass filter (HPF) is used to extract the higher harmonic component $i_d$ other than the fundamental wave.

The 2φ/3φ conversion circuit 101d then re-converts the two-phase signal into a three-phase signal on the basis of the output from the filter 101c and the angular velocity θ. Such a three-phase signal is expressed by the following equations:

$$I_{ca}^* = i_d \cos θ + i_q \sin θ$$

$$I_{cb}^* = i_d \cos (θ-(2/3)π) + i_q \sin (θ-(2/3)π)$$

$$I_{cc}^* = i_d \cos (θ=(4/3)π) + i_q \sin (θ-(4/3)π)$$

In a manner described above, the reference compensation current detection circuit 101 outputs the reference compensation current $I_C^*$ (the compensation volume for removing higher harmonics). The inverter circuit 8 drives the inverter transformer 7 to allow it to generate the compensation current $I_C$ on the basis of the reference compensation current $I_C^*$.

Figure 3:
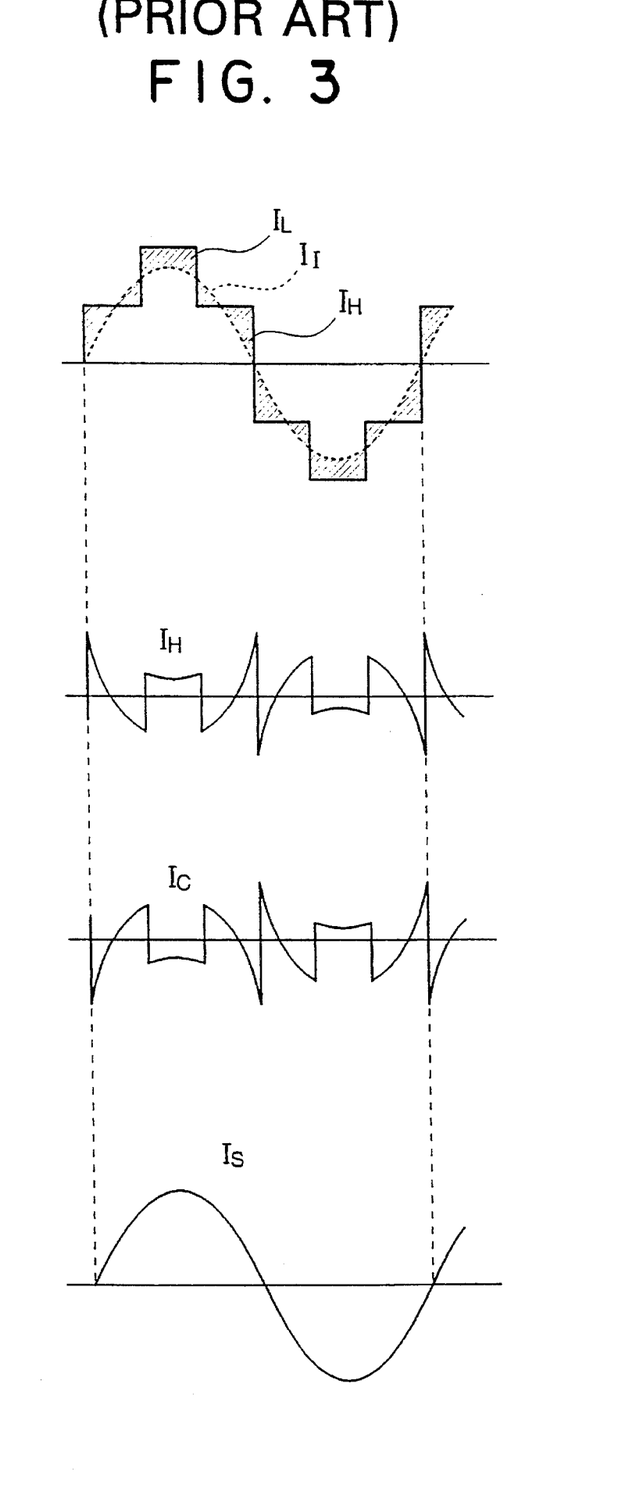
FIG. 3 illustrates waveforms obtained by the operation of the conventional active filter device.

A specific waveform is illustrative of the above operation by way of example. FIG. 3 illustrates the waveforms obtained from the operation of the assumed rectifier load. The load current $I_L$ shown in FIG. 3 is detected by the current transformer 5. The load current $I_L$ can be divided into the fundamental wave component I1 (the waveform indicated by the broken line) and the higher harmonic $I_H$ (indicated by the hatched portion). For removing the higher harmonic $I_H$, the active filter 6 detects it (the reference compensation current $I_C^*$) by the reference compensation current detection circuit 101 and actuates the self-excited inverter 8 so as to allow the current $I_C$ which has a phase opposite to that of the higher harmonic $I_H$ to flow from the supply system to the active filter 6. Thus, the current $I_H$ can be canceled by the current $I_C$, thereby permitting the sine wave current $I_S$ including only the fundamental wave component to flow into the power supply.

The conventional active filter device is constructed as described above so that higher harmonics other than the fundamental wave can be removed. However, such a device presents the following problems. A phase margin is dissipated for the higher order of harmonics because of the idle time spent by the control system of the active filter device 6, thus jeopardizing stable control.

Further, as illustrated in FIG. 2, when the capacitative load 4 is contained in the load to be compensated 2, antiresonance (parallel resonance) is caused between the load 2 and the power supply reactance, thereby increasing the possibility of intensifying the higher harmonics (the active filter device compensates for the antiresonant frequency component contained in the load current, thereby making the control system unstable). In other words, when the active filter device 6 compensates for the higher harmonics at the above-mentioned antiresonance point, a phase margin is dissipated because of a sharp change in the phase at the antiresonance point and the idle time spent by the control system of the active filter device, thus enhancing the diverged control and making the device inoperative.

In order to overcome the above drawbacks, it is necessary to use a passive filter in order to absorb the higher harmonic current in the vicinity of the antiresonant frequency, and accordingly, such a system is constructed of a combination of an active filter device and a passive filter, thus increasing the price of the system.

SUMMARY OF THE INVENTION

Accordingly, in order to solve the above problems, an object of the present invention is to provide an active filter device which is simple in construction and low in price, and in which the stable control can be guaranteed for any respective order of higher harmonic components including the fundamental wave by determining reference compensation currents of higher harmonic components respectively even when a load to be compensated includes a capacitative load, and thus has an antiresonance point.

In order to achieve the above objects, according to the present invention, there is provided an active filter device comprising: a current detector for detecting a load current flowing into a system formed of a power supply and a load to be compensated connected to said power supply; a frequency detection circuit for detecting each of a first to an n-th frequency components contained in said load current so as to output them; a first to an n-th reference compensation current processing circuits each of which performs the phase compensation for the corresponding frequency component detected by said current detector so as to determine a reference compensation current for corresponding frequency component; a synthesizer for synthesizing the output from each of said processing circuits so as to generate a resultant reference compensation current; a control section for generating a control signal based on the output from said synthesizer; an inverter circuit driven by the control signal output from said control section; and an inverter transformer for sending out to said system a compensation current for suppressing a higher harmonic contained in said load current on the basis of the output from said inverter circuit.

DESCRIPTION OF THE PREFERRED EMBODIMENTS

First Embodiment

A first embodiment of the present invention will now be described with reference to the drawings.

Figure 1A:
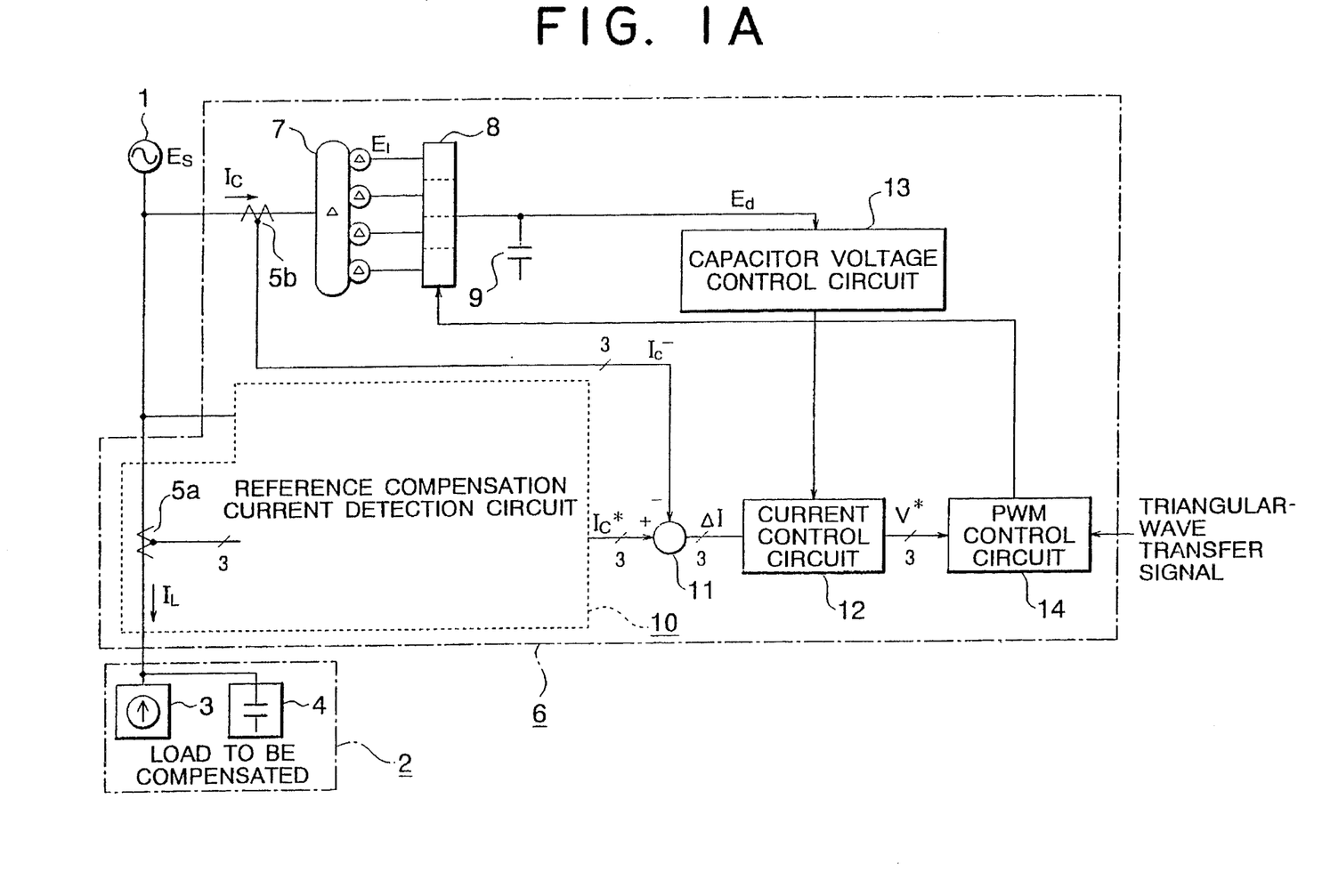
FIG. 1A illustrates the construction of an active filter device according to a first embodiment of the present invention.
Figure 1B:
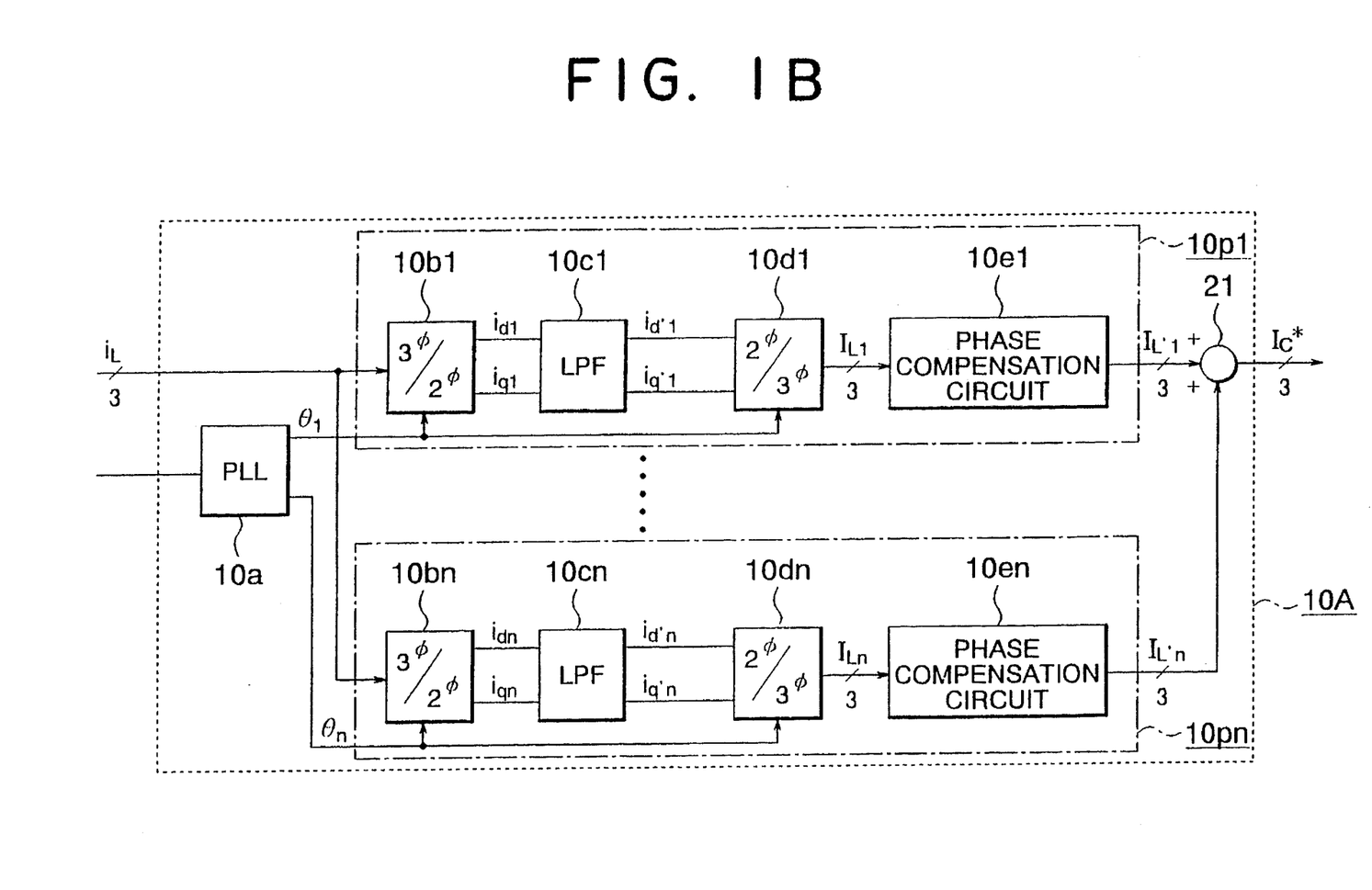
FIG. 1B illustrates the construction of a reference compensation current detection circuit of the active filter device according to the first embodiment of the present invention.

FIG. 1A illustrates the construction of an active filter device according to the present invention. FIG. 1B illustrates a reference compensation current detection circuit 10 included in the active filter device of the present invention. The components other than the reference compensation current detection circuit 10 are constructed in a manner similar to those of the conventional device.

Referring to FIG. 1B, a PLL circuit 10a detects the angular velocity (phase angle) $\theta_1, \theta_2, \ldots \theta_n$ (=k$\theta$, k=1,2, ..., hereinafter k is referred to as "the order") of respective components formed of the fundamental wave in synchronism with the system voltage, the second higher harmonic, ..., the n-th order higher harmonic and then outputs the detected angular velocity of the respective components to a fundamental wave processing circuit 10p1, a second higher harmonic processing circuit 10p2, ..., an n-th order higher harmonic processing circuit 10pn.

FIG. 1B only illustrates the fundamental wave processing circuit 10p1 and the n-th order higher harmonic processing circuit 10pn as a matter of convenience. Although a description will be only given of the two circuits 10p1 and 10pn, the other circuits, such as the second order higher harmonic processing circuit 10p2 ..., are operated in a manner similar to the above-mentioned two circuits. The reference compensation current detection circuit 10 comprises: 3$\phi$/2$\phi$ conversion circuits 10b1 and 10bn for converting respective three-phase signals corresponding to the load current detected by the current transformer 5a into two-phase signals ($i_{d1}$, $i_{q1}$) ($i_{dn}$, $i_{qn}$) of the fundamental wave and the n-th order higher harmonic, respectively, on the basis of the angular velocity $\theta_1$ (=$\theta$) and $\theta_n$ (=n$\theta$), respectively; low-pass filter circuits (LPF) 10c1 and 10cn for smoothing the two-phase signals ($i_{d1}$, $i_{q1}$) ($i_{dn}$, $i_{qn}$) which are output from the 3$\phi$/2$\phi$ conversion circuits 10b1 and 10pn, respectively; 2$\phi$/3$\phi$ conversion circuits 10d1 and 10dn for converting the smoothed two-phase signals ($i_{d1}'$, $i_{q1}'$) ($i_{dn}'$, $i_{qn}'$) into three-phase signals $I_{L1}$, $I_{Ln}$ on the basis of the angular velocity $\theta$ and n$\theta$, respectively; and phase compensation circuits 10e1 and 10n1 for compensating for the phase in order to guarantee phase margins for the fundamental wave and the n-th order higher harmonic so as to output the signal ($I_{L1}'$, $I_{Ln}'$).

The 3$\phi$/2$\phi$ conversion circuit 10b1, the filter circuit 10c1, the 2$\phi$/3$\phi$ conversion circuit 10d1 and the phase compensation circuit 10e1 form the fundamental wave processing circuit 10p1. Likewise, the 3$\phi$/2$\phi$ conversion circuit 10bn, the filter circuit 10cn, the 2$\phi$/3$\phi$ conversion circuit 10dn and the phase compensation circuit 10en form the n-th order higher harmonic processing circuit 10pn.

An adder 21 adds and synthesizes the output $I_{L1}', \ldots, I_{Ln}'$ from the phase compensation circuits 10e1, ..., 10en of the fundamental wave processing circuit 10p1, ..., the n-th order higher harmonic processing circuit 10pn, respectively, so as to output the result as the reference compensation current $I_C^*$, which is then input into an adder/subtracter 11 shown in FIG. 1A. As in the conventional device illustrated in FIG. 2, the compensation current $I_C$ is controlled based on the compensation current $I_C^*$.

A description will now be given of the operation of the active filter device.

The reference compensation current detection circuit 10 shown in FIG. 1B takes out current components from the fundamental wave and the respective orders of higher harmonics, and performs the phase compensation for the respective orders of current components so as to guarantee phase margins for higher order of harmonics or higher harmonics at the antiresonance point (parallel resonant point), thus outputting the reference compensation current $I_C^*$.

The phase margin is determined by adding 180° to the phase angle obtained when the gain of the open loop frequency characteristics of the feedback control system is 1 ($\phi$=180°+$\theta$). The phase angle $\phi$ substantially determines the degree of stability of the active filter, which is stabilized when $\phi$>0.

The components other than the reference compensation current detection circuit 10 are operated similarly to those in the conventional device, and an explanation thereof will thus be omitted. In the reference compensation current detection circuit 10 illustrated in FIG. 1B, the PLL circuit 10a detects both angular velocity $\theta_1$ (the frequency of the fundamental wave) and the angular velocity $\theta_2, \ldots, \theta_n$ of higher harmonics based on the system current so as to supply them to the fundamental wave processing circuit 10p1, ..., the n-th order higher harmonic processing circuit 10pn, respectively.

The 3$\phi$/2$\phi$ conversion circuit 10b1 of the fundamental wave processing circuit 10p1 converts the three-phase load current $IL(I_{La}, I_{Lb}, I_{Lc})$ into the two-phase signal ($i_{d1}$, $i_{q1}$) on the basis of the angular velocity $\theta_1$ of the fundamental wave detected by the PLL circuit 10a according to the following equations:

$i_d$=(2/3) [$i_{La}$ sin $\theta$+$i_{Lb}$ sin {$\theta$−(2/3)$\pi$}+$i_{Lc}$ sin {$\theta$−(4/3)$\pi$}]

$i_q$=(2/3) [$i_{La}$ cos $\theta$+$i_{Lb}$ cos {$\theta$−(2/3)$\pi$}+$i_{Lc}$ cos {$\theta$−(4/3)$\pi$}]

Similarly, in order to take out the n-th order higher harmonic from the load current $I_L$, the 3$\phi$/2$\phi$ conversion circuits 10bn the n-th order higher harmonic processing circuit 10pn utilizes the n-th order angular velocity (phase angle) $\theta_n$(=n$\theta$) in place of the angular velocity $\theta_1$ in the above equations so as to perform the 3$\phi$/2$\phi$ conversion 10b, thereby detecting the two-phase signal ($i_{dn}$, $i_{qn}$).

The thus-obtained two-phase signals ($i_{d1}$, $i_{q1}$) ($i_{dn}$, $i_{qn}$) have the unnecessary ripples removed by the low-pass filters (LPF) 10c1, 10cn, respectively, resulting in the respective orders of the two-phase signals ($i_{d1}'$, $i_{q1}'$) ($i_{dn}'$, $i_{qn}'$), which are then re-converted to the three-phase AC signals ($I_{L1}$, $I_{Ln}$) based on the angular velocity $\theta_1$, $\theta_n$ in the 2$\phi$/3$\phi$ conversion circuits 10d1, 10dn, respectively. The three-phase AC signal can be expressed by the following equations:

$I_{Lak}$=$i_{dk}$ cos $\theta_k$+$i_{qk}$ sin $\theta_k$ $$I_{Lbk}=i_{dk}\cos(\theta_k-(2/3)\pi)+i_{qk}\sin(\theta_k-(2/3)\pi)$$

$$I_{Lck}=i_{dk}\cos(\theta_k-(4/3)\pi)+i_{qk}\sin(\theta_k-(4/3)\pi)(k=1,\ldots,n)$$

The three-phase signals ($I_{L1}$, $I_{Ln}$) pass through the phase compensation circuit 10e, 10en, respectively, so as to compensate for the lag component peculiar to the active filter device 6, thereby creating the respective orders of compensated signals ($I_{L1}'$, $I_{Ln}'$). The resultant signals are synthesized by the adder 21 and the reference compensation current ($I_C^*=I_{L1}'+\ldots+I_{Ln}'$) is generated.

The phase compensation circuit 10e with a transfer function, for example, is employed as indicated by the following equation:

$$G(s)=K(1+sT_a)/(1+sT_b)$$

wherein K: proportional gain; Ta: time constant determining the break point a; Tb: time constant determining the break point b; and s: the Laplace operator.

In the above equation of the transfer function G(s), when $1/T_a<1/T_b$, the phase-lead compensation is performed, and on the other hand, when $1/T_b<1/T_a$, the phase-lag compensation is performed. Thus, a suitable selection of the parameters Ta and Tb enables a desired phase compensation.

In other words, in the phase compensation circuit 10e, the phase compensation is performed for the lag time of the active filter device 6 so that phase margins can be obtained for the respective orders of higher harmonics, that is, $\phi>0$ in the open loop frequency characteristics of the feedback system ($\phi=180°+\theta$, $\theta$ is the phase angle obtained when the gain is 1.). For example, when the lag time is exp (−Ts), the phase compensation is performed for the n-th order of higher harmonic such that the phase is lead for $n2\pi fT$(f:fundamental frequency) or more.

Likewise, the phase compensation is performed for the antiresonance frequency $\theta_r$ ($n\theta<\theta_r<(n+1)\theta$) so as to obtain a phase margin.

As will be clearly understood from the foregoing description, the present invention offers the following advantages.

According to the first embodiment, the phase compensation circuits 10e1, ..., 10en compensate for the respective orders of higher harmonics so as to compensate for the waste time of the active filter device, thereby ensuring the stable control of the device. Further, even when a plurality of antiresonance frequencies are contained in the current, phase margins for the respective orders of higher harmonics can be created, thereby constantly stabilizing the control system.

Second Embodiment

Although the phase compensation circuits 10e1, ..., 10en compensate for the phase of the signal $I_{Ln}$ in the first embodiment, a gain compensation circuit may be substituted for the phase compensation circuit so as to adjust the gain for the respective higher harmonics.

Figure 1C:
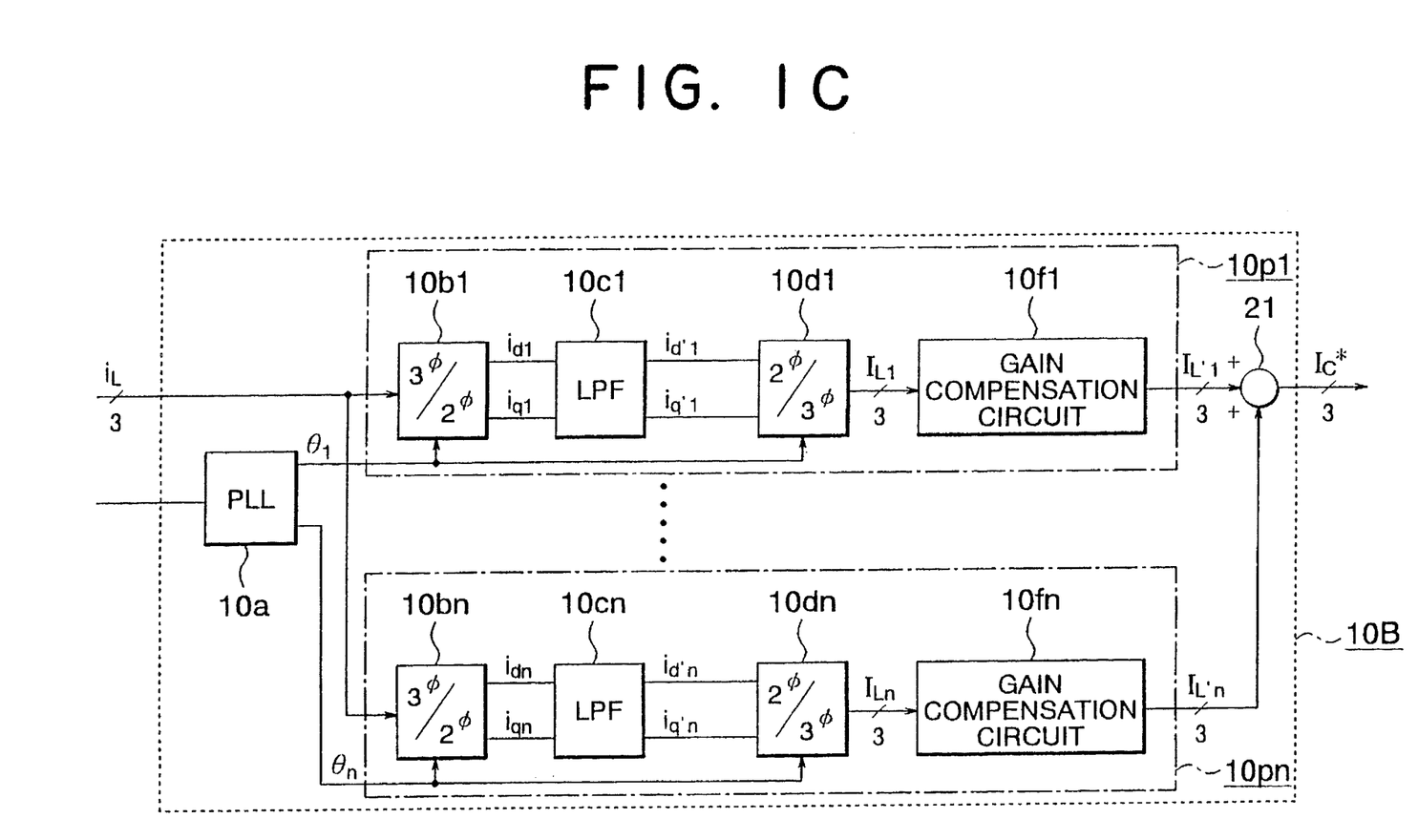
FIG. 1C illustrates the construction of a reference compensation current detection circuit of the active filter device according to a second embodiment of the present invention.

FIG. 1C illustrates the construction of the reference compensation current detection circuit 10 according to a second embodiment. The detection circuit 10 includes gain compensation circuits 10f1, ..., 10fn compensating for the gain of the respective outputs $I_{L1}$, ..., $I_{Ln}$ from the 2ϕ/3ϕ phase conversion circuits 10d1, ..., 10dn. The PLL circuit 10a, the 3ϕ/2ϕ conversion circuit 10b, the filter circuit 10c and the 2ϕ/3ϕ conversion circuit 10d are the same as those in the first embodiment.

The gain compensation circuit 10f in the second embodiment controls the gain of the fundamental wave and the respective higher harmonics so that phase margins can be obtained in the feedback control. For example, when a resonance point is present in the vicinity of a higher harmonic, thus jeopardizing the stable control, the gain K is set to be zero (K=0), and accordingly, the reference compensation current can be zero for such a higher harmonic, thus avoiding the control for the frequency having the above order of higher harmonic and thereby preventing unstable control.

As described above, instead of obtaining a phase margin by the phase compensation, a gain margin is created by regulating the gain for higher order of harmonics or a higher harmonic present in the vicinity of an antiresonant frequency, thereby stabilizing the control system, in which case, advantages similar to those in the first embodiment can be obtained.

Third Embodiment

Although in the foregoing description an explanation is given of the phase compensation for a combination of a fundamental wave and an n-th order higher harmonic, that is, the phase compensation is performed for both fundamental wave and an n-th order higher harmonic, the present invention is applicable to a combination of higher harmonics (for example, second and third orders of higher harmonics), thereby only processing higher harmonics which might possibly jeopardize the stable control. Such a modification is also applicable to the gain compensation.

What is claimed is:

1. An active filter device for filtering harmonic current components in a power line of a system including a power supply source coupled to a load, said active filter comprising:

a current detector coupled to said power line for detecting a load current a frequency detection circuit coupled to said power line for detecting each of a first to an n-th frequency components contained in said load current so as to output them, wherein n is an integer greater than 1;

a first to an n-th reference compensation current processing circuits each of which performs the phase compensation for the corresponding frequency component detected by said current detector so as to determine a reference compensation current for corresponding frequency component, said first to n-th compensation current processing circuits being connected to said current detector and to said frequency detection circuit;

an adder for adding the output from each of said processing circuits so as to generate a resultant reference compensation current;

a control section connected to said adder for generating a control signal based on the output from said synthesizer;

an inverter circuit coupled to said control section driven by the control signal output from said control section; and an inverter transformer coupled between said power line and said inverter circuit for sending out to said system a compensation current for suppressing a higher harmonic contained in said load current on the basis of the output from said inverter circuit.

2. An active filter device according to claim 1, defining k as any integer from 1 to said n, the k-th reference compensation current processing circuit comprising:

a three-phase/two-phase conversion circuit for converting said load current from a three-phase signal to a two-phase signal on the basis of the k-th frequency component which is output from said frequency detection circuit;

a filter circuit for removing an unnecessary signal from the output from said three-phase/two-phase conversion circuit;

a two-phase/three-phase conversion circuit for converting the output from said filter circuit from the two-phase signal to a three-phase signal on the basis of the k-th frequency component which is output from said frequency detection circuit; and a phase compensation circuit for performing the phase compensation for the output from said two-phase/three-phase conversion circuit so as to determine a reference compensation current with respect to the k-th frequency component.

3. An active filter device according to claim 1 wherein said frequency detection circuit detects a fundamental wave component contained in said load current as a first frequency component so as to output it and also detects each of higher harmonics contained in said load current as a second to an n-th frequency component so as to output it.

4. An active filter device according to claim 1 wherein said frequency detection circuit detects a first to an n-th orders each of higher harmonics contained in said load current as a first to an n-th frequency components.

5. An active filter device according to claim 2 wherein said three-phase/two-phase conversion circuit of said k-th reference compensation current processing circuit executes conversion based on the following equations:

$$i_{dk}=(2/3)[i_{La} \sin \theta_k + i_{Lb} \sin \{\theta_k-(2/3)\pi\} + i_{Lc} \sin \{\theta_k-(4/3)\pi\}]$$

$$[i_{qk}=(2/3)[i_{La} \cos \theta_k + i_{Lb} \cos \theta_k-(2/3)\pi + i_{Lc} \cos \theta_k-(4/3)\pi]]$$

$$i_{qk}=(2/3)[i_{La} \cos \theta_k + i_{Lb} \cos \{\theta_k'(2/3)\pi\} + i_{Lc} \cos \{\theta_k-(4/3)\pi\}](k=1, \ldots, n)$$

wherein $i_{La}$, $i_{Lb}$, $i_{Lc}$ indicate the load current detected by said current detector and $\theta_k$ represents the angular velocity of a frequency component detected by said frequency detection circuit and $i_{dk}$ and $i_{qk}$ indicate the three-phase/two-phase converted load current.

6. An active filter device according to claim 2 wherein said two-phase/three-phase conversion circuit of said k-th reference compensation current processing circuit executes conversion based on the following equations:

$$I_{Lak}=i_{dk} \cos \theta_k + i_{qk} \sin \theta_k$$

$$I_{Lbk}=i_{dk} \cos (\theta_k-(2/3)\pi) + i_{qk} \sin (\theta_k-(2/3)\pi)$$

$$I_{Lck}=i_{dk} \cos (\theta_k-(4/3)\pi) + i_{qk} \sin (\theta_k-(4/3)\pi) \ (=1, \ldots, n)$$

wherein $i_{dk}$, $i_{qk}$ indicate a two-phase signal which is output from said three-phase/two-phase conversion circuit after passing through said filter circuit and $I_{ak}$, $I_{Lak}$ and $I_{lck}$ indicate two-phase/three-phase connected signals.

7. An active filter device according to claim 2 wherein said phase compensation circuit of said k-th reference compensation current processing circuit performs the phase compensation so as to ensure a phase margin of a feedback control system for the k-th frequency component detected by said frequency detection circuit.

8. An active filter device according to claim 1, defining k as any integer from 1 to said n the k-th reference compensation current processing circuit comprising:

a three-phase/two-phase conversion circuit for converting said load current from a three-phase signal to a two-phase signal on the basis of the k-th frequency component which is output from said frequency detection circuit;

a filter circuit for removing an unnecessary signal from the output from said three-phase/two-phase conversion circuit;

two-phase/three-phase conversion circuit for converting the output from said filter circuit from the two-phase signal to a three-phase signal on the basis of the k-th frequency component which is output from said frequency detection circuit; and a gain compensation circuit for performing the gain compensation for the output from said two-phase/three-phase conversion circuit so as to determine a reference compensation current with respect to the k-th frequency component.

9. An active filter device according to claim 8 wherein said three-phase/two-phase conversion circuit of said reference compensation current processing circuit executes conversion based on the following equations:

$$i_{dk}=(2/3)[i_{La} \sin \theta_k + i_{Lb}\sin\{\theta_k-(2/3)\pi\} + i_{Lc} \sin \{\theta_k-(4/3)\pi\}]$$

$$i_{qk}=(2/3)[i_{La} \cos \theta_k + i_{Lb} \cos \{\theta_k-(2/3)\pi\} + i_{Lc} \cos \{\theta_k-(4/3)\pi\}](k=1, \ldots, n)$$

wherein $i_{La}$, $i_{Lb}$, $i_{Lc}$ indicate the load current detected by said current detector and $\theta_k$ represents the angular velocity of a frequency component detected by said frequency detection circuit.

10. An active filter device according to claim 8 wherein said two-phase/three-phase conversion circuit of said reference compensation current processing circuit executes conversion based on the following equations:

$$I_{Lak}=i_{dk} \cos \theta_k + i_{qk} \sin \theta_k$$

$$I_{Lbk}=i_{dk} \cos (\theta_k-(2/3)\pi) + i_{qk} \sin (\theta_k-(2/3)\pi)$$

$$I_{Lck}=i_{dk} \cos (\theta_k-(4/3)\pi) + i_{qk} \sin (\theta_k-(4/3)\pi) \ (K=1, \ldots, n)$$

wherein $i_{dk}$, $i_{qk}$ indicate a two-phase signal which is output from said three-phase/two-phase conversion circuit after passing through said filter circuit.

* * * * *

UNITED STATES PATENT AND TRADEMARK OFFICE
CERTIFICATE OF CORRECTION

PATENT NO. : 5,498,994
DATED : March 12, 1996
INVENTOR(S) : Furuta

It is certified that error appears in the above-indentified patent and that said Letters Patent is hereby corrected as shown below:

Column 8, Line 30, after "current" insert --;--;

Column 9, Line 29, change "(2/3)" (second occurrence) to --¯(2/3)--;

Line 45, change "(=1,...,n)" to --(k=1,...,n)--;

Column 10, Line 5, after "to" delete --said--;

Line 16, before "two-phase" insert --a--;

Line 47, change "(K=1....,n) to --(k=1....,n)--.

Signed and Sealed this

Thirtieth Day of July, 1996

Attest:

BRUCE LEHMAN

Attesting Officer  Commissioner of Patents and Trademarks